US009665948B2

(12) United States Patent
Lin et al.

(10) Patent No.: US 9,665,948 B2
(45) Date of Patent: May 30, 2017

(54) SATURATION COMPENSATION METHOD

(71) Applicant: Quanta Computer Inc., Kuei Shan Hsiang, Tao Yuan Shien (TW)

(72) Inventors: Keng-Sheng Lin, Tao Yuan Shien (TW); Chung-Te Li, Tao Yuan Shien (TW)

(73) Assignee: QUANTA COMPUTER INC., Guishan Dist., Taoyuan (TW)

(*) Notice: Subject to any disclaimer, the term of this patent is extended or adjusted under 35 U.S.C. 154(b) by 0 days.

(21) Appl. No.: 14/547,380

(22) Filed: Nov. 19, 2014

(65) Prior Publication Data

US 2016/0093066 A1 Mar. 31, 2016

(30) Foreign Application Priority Data

Sep. 30, 2014 (TW) .............................. 103133866 A

(51) Int. Cl.
| | |
|---|---|
| *G06T 7/40* | (2017.01) |
| *G06T 11/00* | (2006.01) |
| *H04N 9/67* | (2006.01) |
| *H04N 9/68* | (2006.01) |

(52) U.S. Cl.
CPC ............ *G06T 7/408* (2013.01); *G06T 11/001* (2013.01); *H04N 9/67* (2013.01); *H04N 9/68* (2013.01)

(58) Field of Classification Search
CPC ........ H04N 9/643; H04N 1/60; G06T 11/001; G06T 2207/10024; G06T 11/00; G06T 7/408; G06K 9/4652; G06K 15/1878
See application file for complete search history.

(56) References Cited

U.S. PATENT DOCUMENTS

| | | | | |
|---|---|---|---|---|
| 6,665,439 B1* | 12/2003 | Takahashi | ............ | G06K 9/0063 382/165 |
| 6,674,487 B1* | 1/2004 | Smith | .................... | H04N 9/643 348/649 |
| 7,034,959 B1* | 4/2006 | Takemoto | ............. | G06T 11/001 358/1.9 |
| 8,164,613 B2* | 4/2012 | Tsukada | ............. | G06Q 30/0283 348/14.02 |
| 8,218,866 B2* | 7/2012 | Chu Ke | ................. | H04N 1/608 382/167 |
| 8,406,514 B2* | 3/2013 | Shinoda | ............. | G06K 9/00134 382/162 |
| 2005/0036678 A1 | 2/2005 | Loew | | |

(Continued)

FOREIGN PATENT DOCUMENTS

CN 103533321 1/2014

OTHER PUBLICATIONS

Chinese language office action dated Sep. 26, 2015, issued in application No. TW 103133866.

*Primary Examiner* — Jingge Wu
(74) *Attorney, Agent, or Firm* — McClure, Qualey & Rodack, LLP

(57) ABSTRACT

A saturation compensation method is provided. The method includes the steps of: retrieving an input image; performing at least one first image process on the input image to generate a first image; calculating saturation corresponding to each pixel in the input image; and performing a saturation compensation process on the first image according to the input image and the saturation to generate an output image.

1 Claim, 4 Drawing Sheets

(56) References Cited

U.S. PATENT DOCUMENTS

| | | | |
|---|---|---|---|
| 2010/0054592 A1* | 3/2010 | Nanu | G06T 5/008 382/167 |
| 2012/0194537 A1* | 8/2012 | Huang | G09G 5/02 345/589 |
| 2012/0210229 A1* | 8/2012 | Bryant | H04N 9/73 715/723 |
| 2013/0094758 A1* | 4/2013 | Yadav | G06T 5/009 382/167 |
| 2015/0070404 A1* | 3/2015 | Chu Ke | G09G 3/3607 345/690 |
| 2016/0005349 A1* | 1/2016 | Atkins | H04N 5/20 345/591 |

* cited by examiner

SATURATION COMPENSATION METHOD

CROSS REFERENCE TO RELATED APPLICATIONS

This Application claims priority of Taiwan Patent Application No. 103133866, filed on Sep. 30, 2014, the entirety of which is incorporated by reference herein.

BACKGROUND OF THE INVENTION

Field of the Invention

The present invention relates to image processing, and, in particular, to an image processing system and a saturation compensation method.

Description of the Related Art

Colors are crucial elements of an imaging system that allows the user to capture the true color of objects in a scene, and also to enhance the accuracy of other advanced functions such as object detection and recognition. However, many image processing modules executed by a conventional image processing system may cause damage to the original color information of an input image, resulting in lower saturation of the output image. Accordingly, there is a demand for an image processing system to solve the aforementioned issue of lower saturation.

BRIEF SUMMARY OF THE INVENTION

A detailed description is given in the following embodiments with reference to the accompanying drawings.

In an exemplary embodiment, a saturation compensation method is provided. The method includes the steps of: retrieving an input image; performing at least one first image process on the input image to generate a first image; calculating saturation corresponding to each pixel in the input image; and performing a saturation compensation process on the first image according to the input image and the saturation to generate an output image.

In another exemplary embodiment, an image processing system is provided. The image processing system comprises: a memory unit and a processor. The processor is configured to retrieve an input image and backup the input image in the memory unit. The processor further performs at least one first image process on the input image to generate a first image, and calculates saturation corresponding to each pixel of the input image. The processor further performs a saturation compensation process on the first image according to the input image and the saturation to generate an output image

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
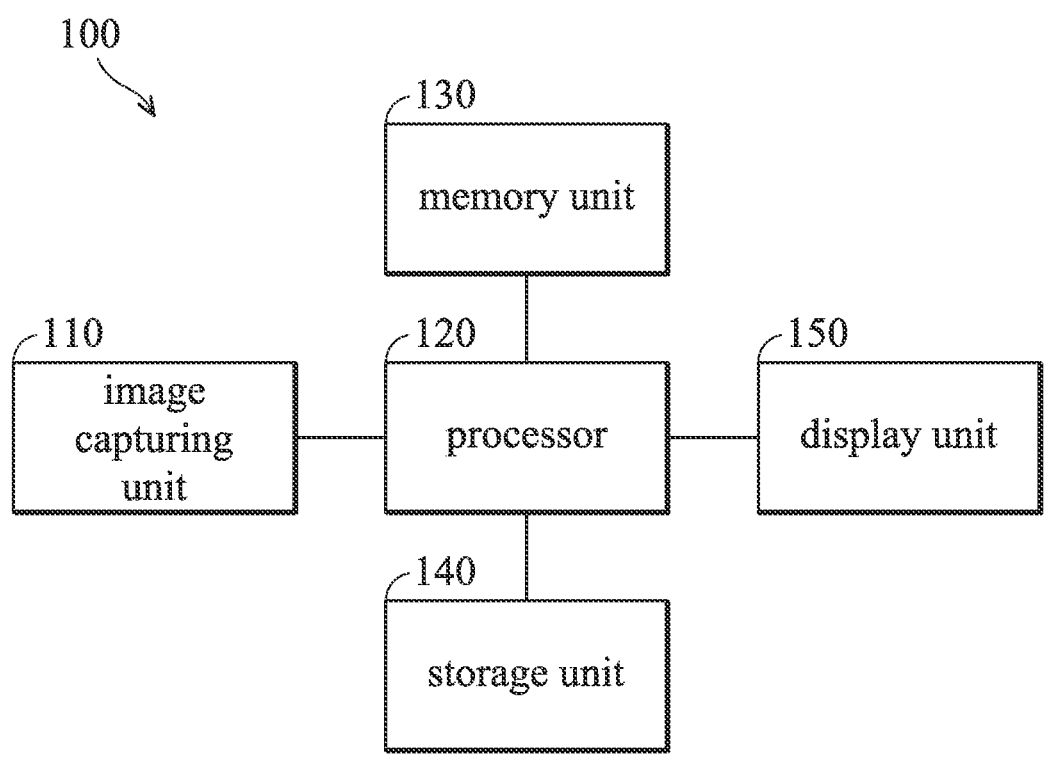
FIG. 1 is a block diagram of an image processing system 100 in accordance with an embodiment of the invention.

FIG. 1 is a block diagram of an image processing system 100 in accordance with an embodiment of the invention. As shown in FIG. 1, the image processing system comprises an image capturing unit 110, a processor 120, a memory unit 130, a storage unit 140, and a display unit 150. The image capturing unit 110 is configured to capture images of a scene. The storage unit 140 is configured to store program codes of various modules for image processing, such as a tone-mapping module, an auto white-balance module, a saturation compensation module, a high dynamic range imaging module, etc. For example, the memory unit 130 is a volatile memory such as a dynamic random access memory (DRAM). The storage unit 140 is a non-volatile memory such as a hard disk, flash memory, etc. The processor 120 loads the program codes of each image processing module stored in the storage unit 140 into the memory unit 130 and performs corresponding image processing on an image. For example, the aforementioned image may be an image captured by the image capturing unit 110, an unprocessed image or a processed image.

Figure 2:
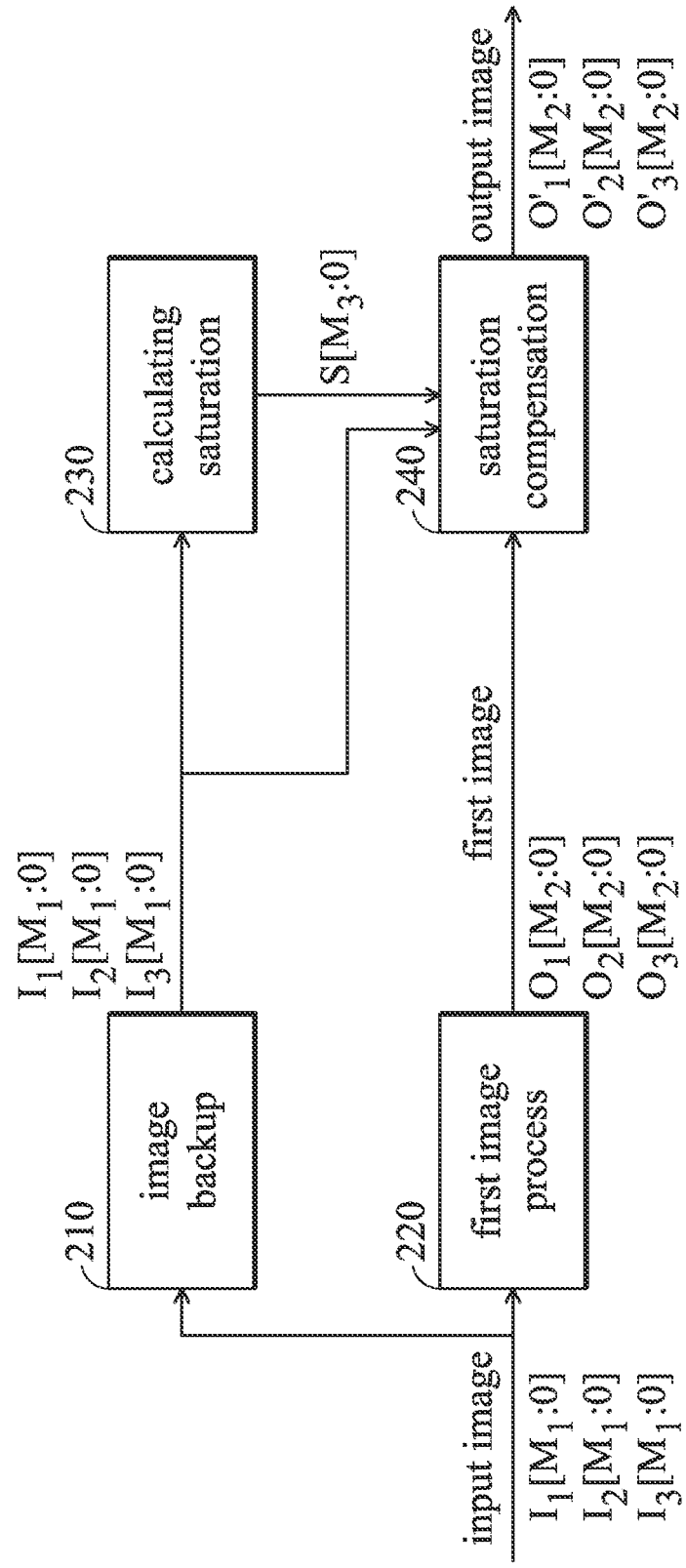
FIG. 2 is a diagram illustrating the procedure of saturation compensation in accordance with an embodiment of the invention.

FIG. 2 is a diagram illustrating the procedure of saturation compensation in accordance with an embodiment of the invention. In an embodiment, the image processing procedure performed by the image processing system 100 is shown in FIG. 2. In an embodiment, the processor 120 may retrieve an input image, wherein the color information of the input image can be denoted by any color space, such as HSV, RGB, or IPT color spaces. It should be noted that the input image may be an image captured by the image capturing unit 110 or a pre-stored image. For description, the RGB color space is used in the following embodiments, and the input image has $I_1$, $I_2$, and $I_3$ color channels having $M_1$ bits.

In block 210, the processor 120 executes an image backup process which indicates that the input image is backed up in the memory unit 130 (or storage unit 140). In block 220, the processor 120 performs one or more first image processes on the input image to generate a first image which has $O_1$, $O_2$, and $O_3$ color channels having $M_2$ bits. It should be noted that the first image processes in block 220 indicates corresponding image processing modules which lower the saturation of the input image, such as the tone-mapping module and the auto white-balance module. For example, the tone-mapping module may compress a target image having a high dynamic range (e.g. 16-bit to 18-bit color information) to an image having 8-bit color information for common storage or display. The saturation of the image processed by the tone-mapping module is significantly reduced. The auto white-balance module is configured to adjust the color of the captured image from the image capturing unit 110, so that the color of objects in the image may be closer to their true color. For example, a white paper may be visually light blue under a light source having a high color temperature, and the same white paper may be visually light yellow under a light source having a low color temperature. The auto white-balance module may extinguish the effect by the light source. Although color shifting of the image can be prevented, the saturation of the image processed by the auto white-balance module will also be significantly reduced. For one having ordinary skill in the art, it will be appreciated that the aforementioned first image processes may also include other image processes which reduce the saturation of the image.

In block 230, the processor 120 retrieves the stored input image and calculates the saturation SI of the input image, wherein the saturation SI has M3 bits. For example, the processor 120 may convert the color information of the input image to a selected color space. If the HSV color space is selected, the processor 120 may calculate numeric values of the color channel S which denotes "saturation". If the RGB color space is selected, the processor 120 may calculate the variance values of the red (R), green (G), and blue (B) color channels. If the IPT color space is selected, the processor 120 may calculate the ratio of the P and T color channels. One having ordinary skill in the art will appreciate the differences between each color channel in the aforementioned color spaces, and the details will be omitted here.

In block 240, the processor 120 may execute a saturation compensation process, such as performing saturation compensation on the first image according to the input image and the saturation thereof to generate an output image with $O'_1$, $O'_2$, and $O'_3$ color channels having $M_3$ bits. Specifically, the processor 120 calculates saturation compensation according to the following formulas:

$$O'_i(x, y) = p(x, y) \times O_i(x, y) + [1 - p(x, y)] \times \frac{Y_O(x, y)}{Y_I(x, y)} I_i(x, y) \quad (1)$$

$$p(x, y) = f(S_I(x, y)) \quad (2)$$

wherein $I_i$ denotes the ith color channel of the input image; $O_i$ denotes the ith color channel of the first image; $O'_i$ denotes the ith color channel of the output image; $Y_o$ denotes the brightness information of the first image; $Y_I$ denotes the brightness information of the input image; I is the amount of primary stimuli in the color space; (x, y) denotes the coordinates of a pixel in an image; and p denotes a weighting factor. In other words, if there are multiple primary stimuli in the selected color space (e.g. an RGB color space), the processor 120 has to perform saturation compensation on each primary stimuli in the selected color space. In addition, while performing saturation compensation, the saturation of pixels in each primary color (i.e. primary color channel) is calculated independently.

In an embodiment, the processor 120 may convert the input image and the first image to a perceptual-based color space such as the IPT or CIELAB color spaces. In the perceptual-based color space, the differences between colors can be calculated using the Euclidean distance, and a better saturation compensation result can be obtained by formula (1).

Figure 3:
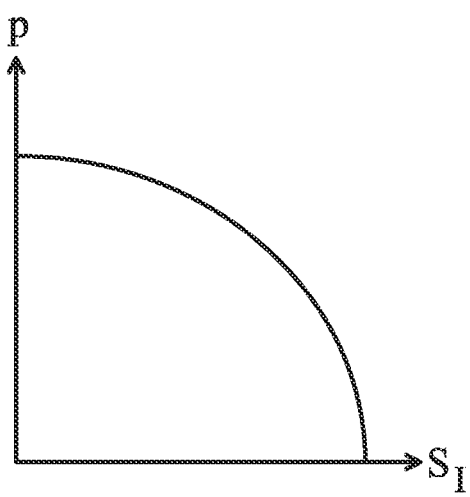
FIG. 3 is a diagram illustrating the saturation compensation function in accordance with an embodiment of the invention.

FIG. 3 is a diagram illustrating the saturation compensation function in accordance with an embodiment of the invention. In an embodiment, when a natural object has a low saturation, it is not appropriate to over-compensate for the saturation of the natural object while performing a saturation compensation. A saturation compensation function is provided in the invention. When the saturation of the pixel at coordinate I(x,y) of the input image is lower, the pixel at coordinate O(x,y) of the output image has a higher weighting, as shown in FIG. 3. Specifically, the processor 120 may adaptively adjust the weighting factor p of the pixels in the input image in formula (1) according to the saturation $S_I$ of the pixels in the input image. The saturation compensation function is utilized in the calculation of saturation in block 230 of FIG. 2, thereby retaining the natural look of the image during the saturation compensation process.

Figure 4:
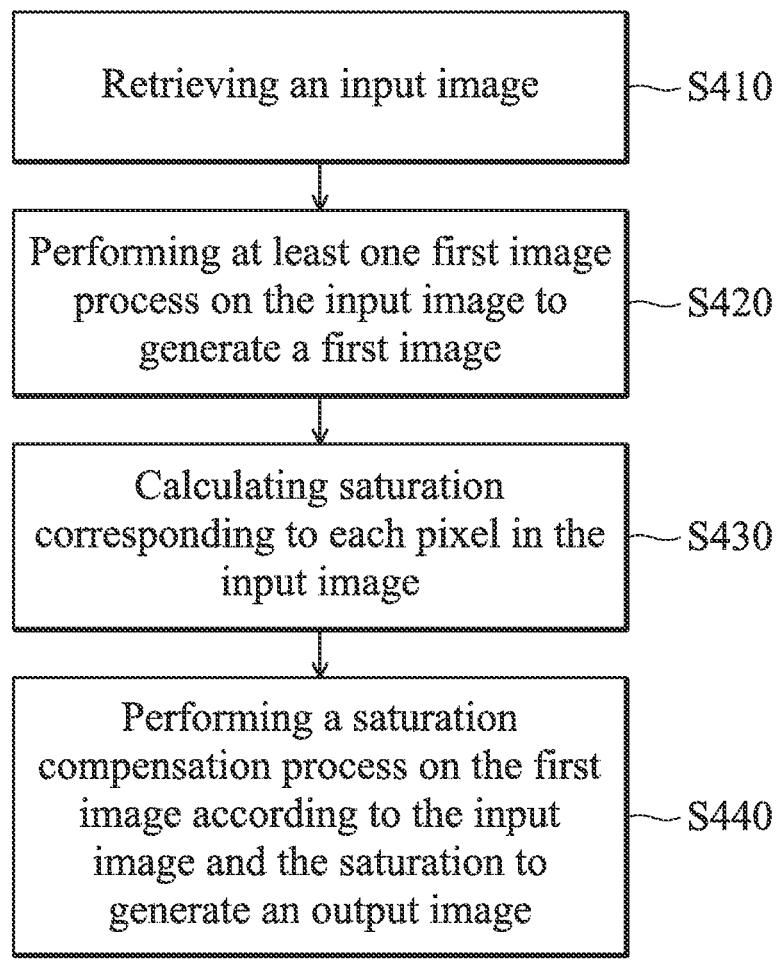
FIG. 4 is a flow chart of a saturation compensation method in accordance with an embodiment of the invention.

FIG. 4 is a flow chart of a saturation compensation method in accordance with an embodiment of the invention. In step S410, an input image is retrieved. In step S420, at least one first image process is performed on the input image to generate a first image. For example, the first image processes may correspond to image processes which lower the saturation of the input image, such as auto white-balancing, tone-mapping, etc. In step S430, saturation corresponding to each pixel in the input image is calculated. It should be noted that the input may have at least one color channel (or primary color) based on the selected color space, and the processor 120 may independently calculate the saturation of pixels in each color channel, wherein the details can be referred to in formulas (1) and (2) in the aforementioned embodiment. In step S440, a saturation compensation process is performed on the first image according to the input image and the saturation thereof to generate an output image. Specifically, the saturation of an image after performing image processes is generally lowered. However, in the invention, the saturation of each pixel in the input image can be referenced while performing the saturation compensation, thereby obtaining a more natural-looking saturation-compensated image.

In view of the above, an image processing system and a saturation compensation method are provided in the invention. The image processing system and the saturation compensation method may adaptively adjust the saturation of the pixels in the output image after saturation compensation according to the saturation of pixels in the input image.

The methods, or certain aspects or portions thereof, may take the form of a program code embodied in tangible media, such as floppy diskettes, CD-ROMs, hard drives, or any other machine-readable (e.g., computer-readable) storage medium, or computer program products without limitation in external shape or form thereof, wherein, when the program code is loaded into and executed by a machine such as a computer, the machine thereby becomes an apparatus for practicing the methods. The methods may also be embodied in the form of program code transmitted over some transmission medium, such as an electrical wire or a cable, or through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A saturation compensation method, which is executed by a processor, the method comprising:

retrieving an input image;

performing at least one first image process on the input image to generate a first image, wherein the at least one first image process lowers saturation of the input image to generate the first image;

calculating saturation corresponding to each pixel in the input image;

converting the input image and the first image to a color space, wherein the color space comprises at least one color channel;

calculating the saturation corresponding to each pixel in each color channel of the input image in the color space respectively, wherein the saturation corresponding to each pixel of the input image is lower, the saturation corresponding to each pixel of the output image has a higher weighting; and performing a saturation compensation process on the first image according to a first formula to generate an output image, wherein the first formula is expressed as:

$$O'_i(x, y) = p(x, y) \times O_i(x, y) + [1 - p(x, y)] \times \frac{Y_O(x, y)}{Y_I(x, y)} I_i(x, y);$$

where $p(x,y)=f(S_f(x,y))$, and $I_i$ denotes the amount of ith primary stimuli in a color space of the input image; $O_i$ denotes the ith color channel of the first image; $O'_i$ denotes the ith color channel of the output image; $Y_o$ denotes brightness information of the first image; $Y_I$ denotes brightness information of the input image; (x, y) denotes the coordinates of a pixel in an image; and p denotes a weighting factor.

* * * * *